United States Patent
Hayashi et al.

(10) Patent No.: US 11,019,256 B2
(45) Date of Patent: May 25, 2021

(54) IMAGE PROCESSING SYSTEM, IMAGE PROCESSING METHOD, AND INFORMATION PROCESSING DEVICE

(71) Applicant: FUJIFILM CORPORATION, Tokyo (JP)

(72) Inventors: Kenkichi Hayashi, Saitama (JP); Masahiro Terada, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/030,386

(22) Filed: Sep. 24, 2020

(65) Prior Publication Data

US 2021/0014414 A1 Jan. 14, 2021

Related U.S. Application Data

(63) Continuation of application No. PCT/JP2018/037631, filed on Oct. 9, 2018.

(30) Foreign Application Priority Data

Mar. 28, 2018 (JP) .............................. JP2018-062727

(51) Int. Cl.
*H04N 5/232* (2006.01)
*G06F 9/50* (2006.01)
(Continued)

(52) U.S. Cl.
CPC ....... *H04N 5/23229* (2013.01); *G06F 9/5094* (2013.01); *H04N 1/00405* (2013.01);
(Continued)

(58) Field of Classification Search
CPC . H04N 1/0067; H04N 1/00169–00172; H04N 1/00204–00244; H04N 5/23203;
(Continued)

(56) References Cited

U.S. PATENT DOCUMENTS

2006/0221197 A1* 10/2006 Jung .................. H04N 5/23241
348/222.1
2006/0285004 A1 12/2006 Suemoto
(Continued)

FOREIGN PATENT DOCUMENTS

JP 2006-352435 A 12/2006
JP 2007-142551 A 6/2007
(Continued)

OTHER PUBLICATIONS

International Search Report issued in International Application No. PCT/JP2018/037631 dated Jan. 8, 2019.
(Continued)

*Primary Examiner* — Paul M Berardesca
(74) *Attorney, Agent, or Firm* — Solaris Intellectual Property Group, PLLC

(57) ABSTRACT

An image processing system includes: a plurality of imaging devices each of which includes an image processing unit that executes image processing including development processing of RAW data obtained by imaging; and an information processing device that acquires power supply information regarding power supply states of the plurality of imaging devices, selects the imaging device that executes the development processing according to the power supply state represented by the acquired power supply information, and causes the selected imaging device to execute the development processing.

10 Claims, 9 Drawing Sheets

(51) Int. Cl.
*H04N 1/00* (2006.01)
*H04N 101/00* (2006.01)

(52) U.S. Cl.
CPC ... *H04N 5/23245* (2013.01); *H04N 5/232411* (2018.08); *H04N 2101/00* (2013.01)

(58) Field of Classification Search
CPC ......... H04N 5/23206; H04N 5/232061; H04N 5/23293; H04N 5/232933; H04N 5/232939; H04N 5/232941; H04N 5/23241–232411; H04N 5/23229; G06F 9/5044; G06F 9/505; G06F 9/5094
See application file for complete search history.

(56) References Cited

U.S. PATENT DOCUMENTS

| | | | |
|---|---|---|---|
| 2011/0119238 A1 | 5/2011 | Mukai | |
| 2016/0057310 A1* | 2/2016 | Hitaka | ............... H04N 1/00244 348/207.1 |
| 2017/0075406 A1* | 3/2017 | Mineo | ................... G06F 9/5094 |

FOREIGN PATENT DOCUMENTS

| | | |
|---|---|---|
| JP | 2010-081258 A | 4/2010 |
| JP | 2011-109443 A | 6/2011 |
| JP | 2015-032890 A | 2/2015 |

OTHER PUBLICATIONS

Written Opinion of the ISA issued in International Application No. PCT/JP2018/037631 dated Jan. 8, 2019.

* cited by examiner

FIG. 4

| MODEL | COEFFICIENT |
|---|---|
| DSC-A1 | 1.6 |
| DSC-A2 | 3.0 |
| DSC-B1 | 2.5 |
| ... | ... |

| FORMAT | COEFFICIENT |
|---|---|
| JPEG | 1.0 |
| TIFF | 0.5 |
| ... | ... |

NUMBER OF PIECES OF RAW DATA THAT CAN BE DEVELOPED
BY EACH IMAGING DEVICE IS AS FOLLOWS.
PLEASE INPUT NUMBER OF PIECES OF RAW DATA TO BE DEVELOPED
BY EACH IMAGING DEVICE AND CLICK EXECUTION BUTTON.

NUMBER OF PIECES
OF RAW DATA
TO BE DEVELOPED

CAMERA 1: 125

CAMERA 2: UNUSABLE

CAMERA 3: 230

EXECUTION

43

IMAGE PROCESSING SYSTEM, IMAGE PROCESSING METHOD, AND INFORMATION PROCESSING DEVICE

CROSS-REFERENCE TO RELATED APPLICATIONS

This application is a continuation application of International Application No. PCT/JP2018/037631, filed Oct. 9, 2018, the disclosure of which is incorporated herein by reference in its entirety. Further, this application claims priority from Japanese Patent Application No. 2018-062727, filed on Mar. 28, 2018, the disclosure of which are incorporated herein by reference in its entirety.

BACKGROUND

1. Technical Field

The present disclosure relates to an image processing system, an image processing method, and an information processing device.

2. Description of the Related Art

In the related art, there is disclosed an information processing device that generates, based on performance data regarding a terminal device that executes development processing of RAW data, a schedule table specifying distribution of the development processing executed by each of a plurality of the terminal devices (see JP2007-142551A). The information processing device transmits RAW data and command data of development processing to each terminal device based on the generated schedule table.

In addition, there is disclosed an imaging device that performs development processing on RAW data based on a development parameter set in an external device to generate development data for display (see JP2015-032890A).

SUMMARY

By the way, in many cases, setting of the development parameter used for the development processing of the RAW data is performed using an information processing device such as a personal computer, so that convenience for a user is improved. This is because a display unit included in the information processing device has a larger screen than a display unit included in the imaging device that generates the RAW data in many cases and has a high visibility.

On the other hand, in a case where the development processing of the RAW data is executed by the information processing device such as the personal computer, the development processing may take a relatively long time because it is executed by software processing. With respect to this, it is conceivable to reduce a time required for the development processing by causing the imaging device having an image processing unit realized by hardware dedicated to the development processing of the RAW data to execute the development processing of the RAW data.

However, in a case where the imaging device is caused to execute the development processing of the RAW data, there is a problem that the development processing may fail without being completed depending on a power supply state of the imaging device. This problem is not considered in techniques disclosed in JP2007-142551A and JP2015-032890A. This problem can occur not only in the imaging device but also in the image processing device driven by a built-in battery.

The present disclosure has been made in view of the above circumstances, and provides an image processing system, an image processing method, and an information processing device capable of suppressing failure in the development processing of the RAW data.

The image processing system of the present disclosure comprises: a plurality of image processing devices each of which includes an image processing unit that executes image processing including development processing of RAW data obtained by imaging; and an information processing device that includes a power supply information acquisition unit that acquires power supply information regarding power supply states of the plurality of image processing devices, a selection unit that selects the image processing device that executes the development processing according to the power supply state represented by the power supply information acquired by the power supply information acquisition unit, and an execution unit that causes the image processing device selected by the selection unit to execute the development processing.

In the image processing system of the present disclosure, each of the plurality of image processing devices may be an imaging device including an imaging unit, and the RAW data may be RAW data obtained by imaging of the imaging unit.

In the image processing system of the present disclosure, each of the plurality of imaging devices may include a built-in battery, and the power supply information may include information representing whether the imaging device is driven by being connected to an external power supply or is driven by the built-in battery, and information representing a remaining capacity of the built-in battery in a case where the imaging device is driven by the built-in battery.

In the image processing system of the present disclosure, the information processing device may further include a derivation unit that derives a processing capacity of the development processing in each of the plurality of image processing devices according to the power supply state represented by the power supply information acquired by the power supply information acquisition unit.

In the image processing system of the present disclosure, the information processing device may further include a display control unit that performs a control of displaying information representing the processing capacity derived by the derivation unit on a display unit, and a reception unit that receives information representing the image processing device selected by a user according to the information displayed on the display unit, and the selection unit may select the image processing device represented by the information received by the reception unit.

In the image processing system of the present disclosure, the display control unit may further perform a control of displaying, on the display unit, information representing that the image processing device in a predetermined state in which the power supply state is poor is unusable.

In the image processing system of the present disclosure, a plurality of pieces of the RAW data may be present, and in a case where the processing capacity required for the development processing of the plurality of pieces of the RAW data exceeds the processing capacity derived by the derivation unit for each of the plurality of image processing devices, the selection unit may select a plurality of the image processing devices in which a total of the processing capacities derived by the derivation unit is equal to or greater than the processing capacity required for the development processing.

In the image processing system of the present disclosure, the derivation unit may further derive the processing capacity according to a format of image data after the development processing.

In the image processing system of the present disclosure, in a case where the RAW data to be subjected to the development processing is stored in the image processing device in a predetermined state in which the power supply state is poor, the execution unit may transfer the stored RAW data to the image processing device selected by the selection unit, and then may execute the development processing.

On the other hand, the image processing method of the present disclosure is an image processing method according to an image processing system including a plurality of image processing devices each of which includes an image processing unit that executes image processing including development processing of RAW data obtained by imaging and an information processing device, the image processing method comprising: acquiring power supply information regarding power supply states of the plurality of image processing devices; selecting the image processing device that executes the development processing according to the power supply state represented by the acquired power supply information; and causing the selected image processing device to execute the development processing.

The information processing device of the present disclosure comprises: a power supply information acquisition unit that acquires power supply information regarding power supply states of a plurality of image processing devices each of which includes an image processing unit that executes image processing including development processing of RAW data obtained by imaging; a selection unit that selects the image processing device that executes the development processing according to the power supply state represented by the power supply information acquired by the power supply information acquisition unit; and an execution unit that causes the image processing device selected by the selection unit to execute the development processing.

The information processing device of the present disclosure comprises: a memory that stores a command to be executed by a computer; and a processor configured to execute the stored command. The processor acquires power supply information regarding power supply states of a plurality of image processing devices each of which includes an image processing unit that executes image processing including development processing of RAW data obtained by imaging, selects the image processing device that executes the development processing according to the power supply state represented by the acquired power supply information, and causes the selected image processing device to execute the development processing.

According to the present disclosure, it is possible to suppress failure in the development processing of the RAW data.

BRIEF DESCRIPTION OF THE DRAWINGS

Exemplary embodiments according to the technique of the present disclosure will be described in detail based on the following figures, wherein:

FIG. 4 is a diagram showing an example of a first coefficient table according to each embodiment;

FIG. 5 is a diagram showing an example of a second coefficient table according to each embodiment;

FIG. 8 is a diagram showing an example of a processing capacity display screen according to the first embodiment;

DETAILED DESCRIPTION

Hereinafter, an embodiment for carrying out the technique of the present disclosure will be described in detail with reference to the drawings.

First Embodiment

Figure 1:
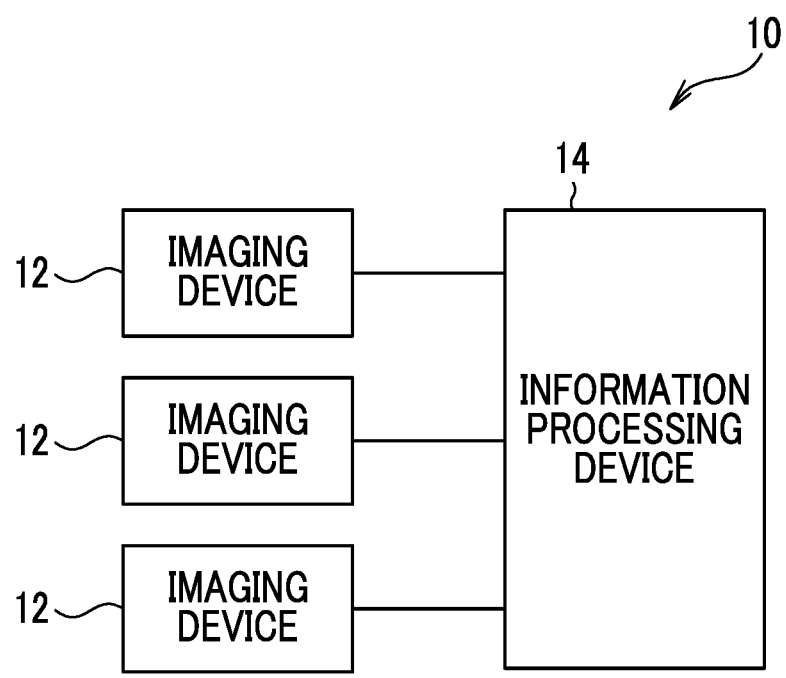
FIG. 1 is a block diagram showing an example of a configuration of an image processing system according to each embodiment.

First, a configuration of an image processing system 10 according to the present embodiment will be described with reference to FIG. 1. As shown in FIG. 1, the image processing system 10 includes a plurality of (three in the example of FIG. 1) imaging devices 12 and one information processing device 14. Each imaging device 12 is connected to the information processing device 14 by at least one of wired communication or wireless communication. The number of imaging devices 12 is not limited to three, and may be two or four or more. In addition, the imaging device 12 is an example of an image processing device. A digital camera is an example of the imaging device 12, and a personal computer is an example of the information processing device 14.

Figure 2:
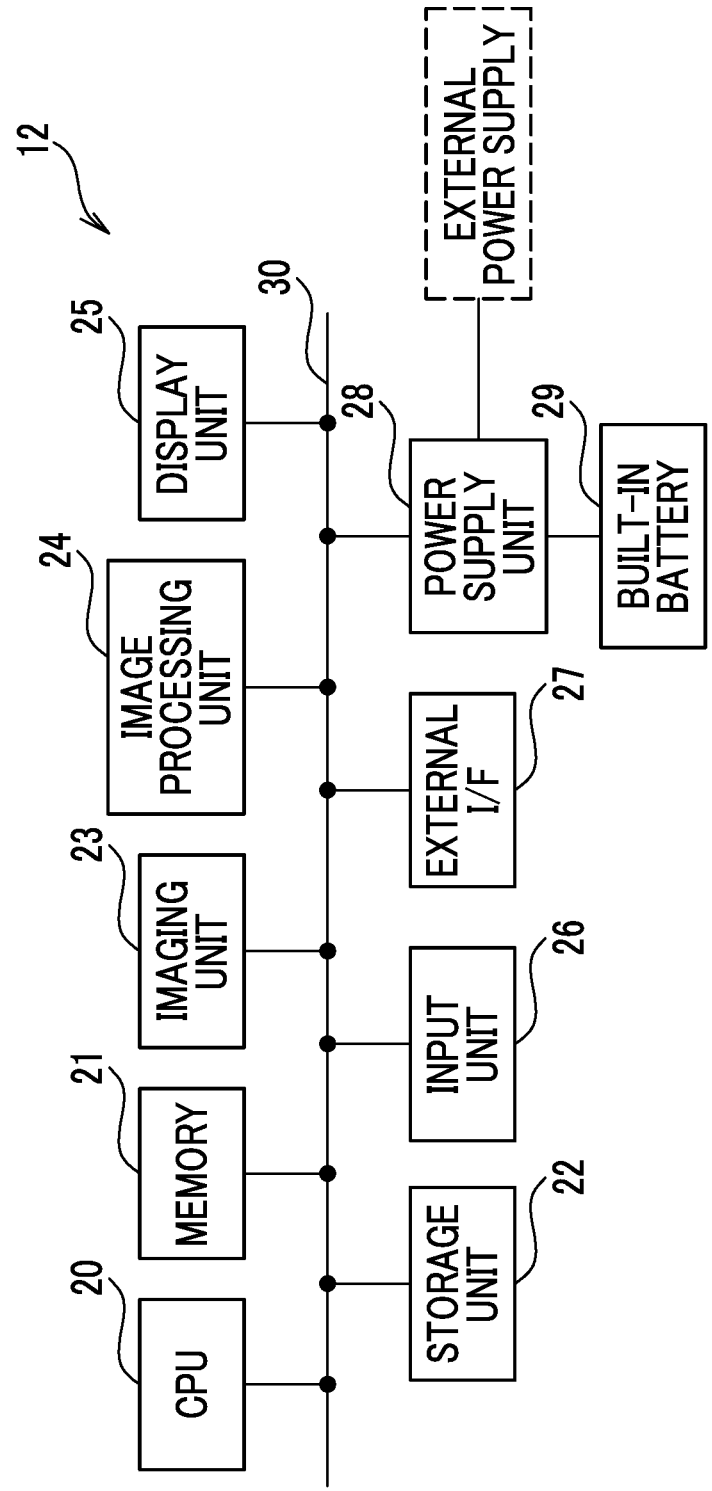
FIG. 2 is a block diagram showing an example of a hardware configuration of an imaging device according to each embodiment.

Next, a hardware configuration of the imaging device 12 according to the present embodiment will be described with reference to FIG. 2. As shown in FIG. 2, the imaging device 12 includes a central processing unit (CPU) 20, a memory 21 as a temporary storage area, a non-volatile storage unit 22 such as a flash memory, an imaging unit 23, and an image processing unit 24. Further, the imaging device 12 includes a display unit 25 such as a liquid crystal display, an input unit 26 such as a dial, a release button, a cross key, a MENU key, and a touch panel, and an external interface (I/F) 27 connected to the information processing device 14. Further, the imaging device 12 includes a power supply unit 28 and a built-in battery 29 such as a lithium ion battery. The CPU 20, the memory 21, the storage unit 22, the imaging unit 23, the image processing unit 24, the display unit 25, the input unit 26, the external I/F 27, and the power supply unit 28 are connected to a bus 30. The built-in battery 29 is not limited to a lithium ion battery, and may be a primary battery or a secondary battery other than the lithium ion battery.

The imaging unit 23 includes an imaging sensor such as a charge coupled device (CCD) image sensor, and outputs RAW data obtained by imaging. The RAW data refers to data that has not undergone image processing for conversion into image data in a joint photographic experts group (JPEG) format, a tagged image file format (TIFF), or the like.

The image processing unit 24 executes image processing including development processing of the RAW data obtained by imaging of the imaging unit 23. The image processing unit 24 according to the present embodiment is realized by hardware such as a semiconductor integrated circuit designed exclusively for image processing. The image processing unit 24 generates image data by executing image processing including development processing on the RAW data, and stores the generated image data in the storage unit 22.

In a case where the imaging device 12 is connected to an external power supply such as an alternating current (AC)-direct current (DC) power supply, the power supply unit 28 supplies a power supplied from the external power supply to each component of the imaging device 12 driven by the power. In addition, in a case where the imaging device 12 is not connected to the external power supply, the power supply unit 28 supplies a power supplied from the built-in battery 29 to each component of the imaging device 12 driven by the power. The external power supply is not limited to the AC-DC power supply, and may be, for example, an information processing device capable of supplying a power to the imaging device 12 by being connected to the imaging device 12.

Figure 3:
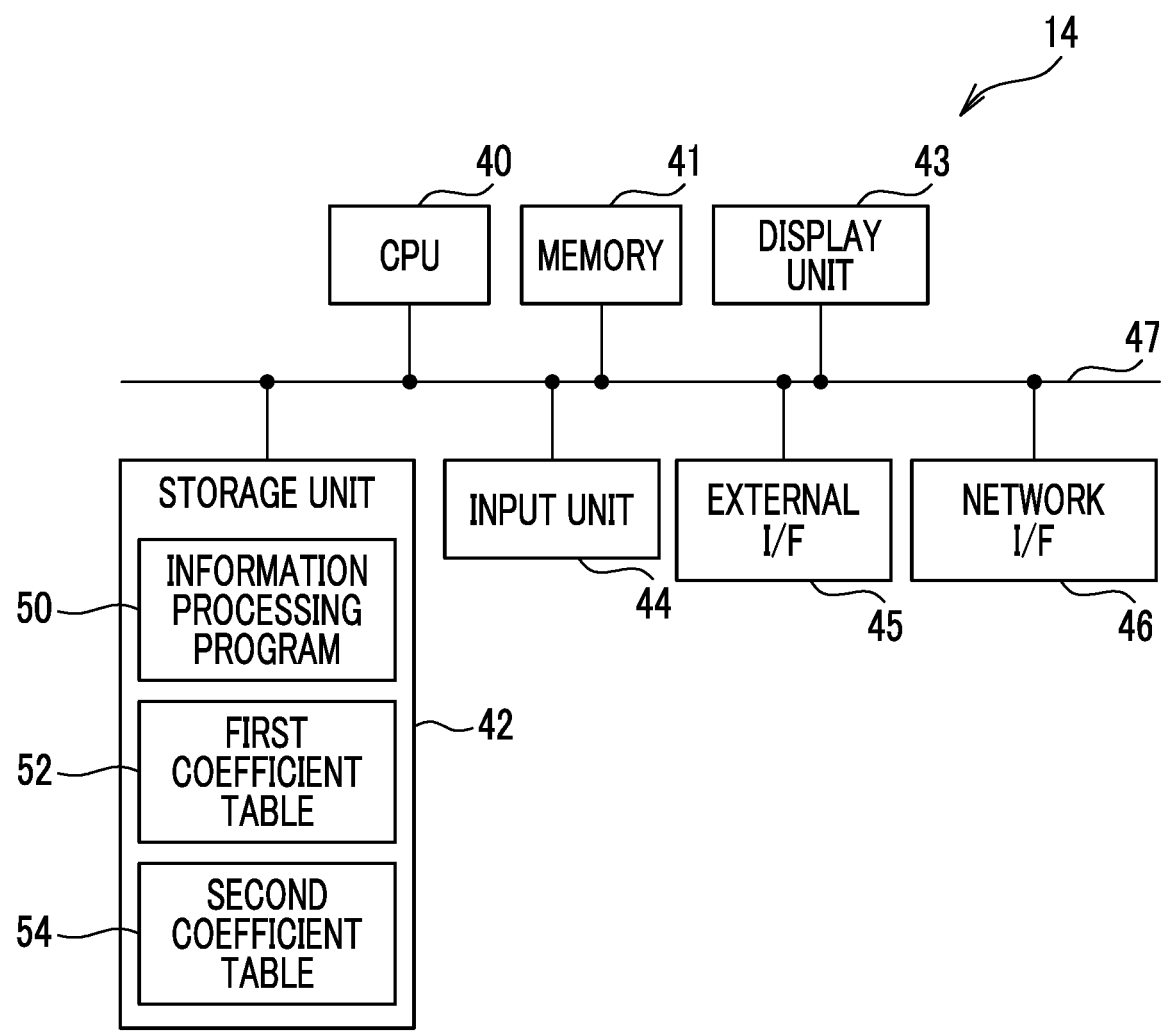
FIG. 3 is a block diagram showing an example of a hardware configuration of an information processing device according to each embodiment.

Next, a hardware configuration of the information processing device 14 according to the present embodiment will be described with reference to FIG. 3. As shown in FIG. 3, the information processing device 14 includes a CPU 40, a memory 41 as a temporary storage area, and a non-volatile storage unit 42. Further, the information processing device 14 includes a display unit 43 such as a liquid crystal display, an input unit 44 such as a keyboard and a mouse, an external I/F 45 to which the imaging device 12 is connected, and a network I/F 46 connected to a network. The CPU 40, the memory 41, the storage unit 42, the display unit 43, the input unit 44, the external I/F 45, and the network I/F 46 are connected to a bus 47.

The storage unit 42 is realized by a hard disk drive (HDD), a solid state drive (SSD), a flash memory, and the like. An information processing program 50 is stored in the storage unit 42 as a storage medium. The CPU 40 reads out the information processing program 50 from the storage unit 42, expands the information processing program 50 in the memory 41, and executes the expanded information processing program 50.

The storage unit 42 also stores a first coefficient table 52 and a second coefficient table 54. FIG. 4 shows an example of the first coefficient table 52. As shown in FIG. 4, the first coefficient table 52 according to the present embodiment stores a coefficient for each model of the imaging device 12. FIG. 5 shows an example of the second coefficient table 54. As shown in FIG. 5, the second coefficient table 54 according to the present embodiment stores a coefficient for each format of image data. The format of image data is not limited to a format of a still image, and may be a format of a moving image.

Figure 6:
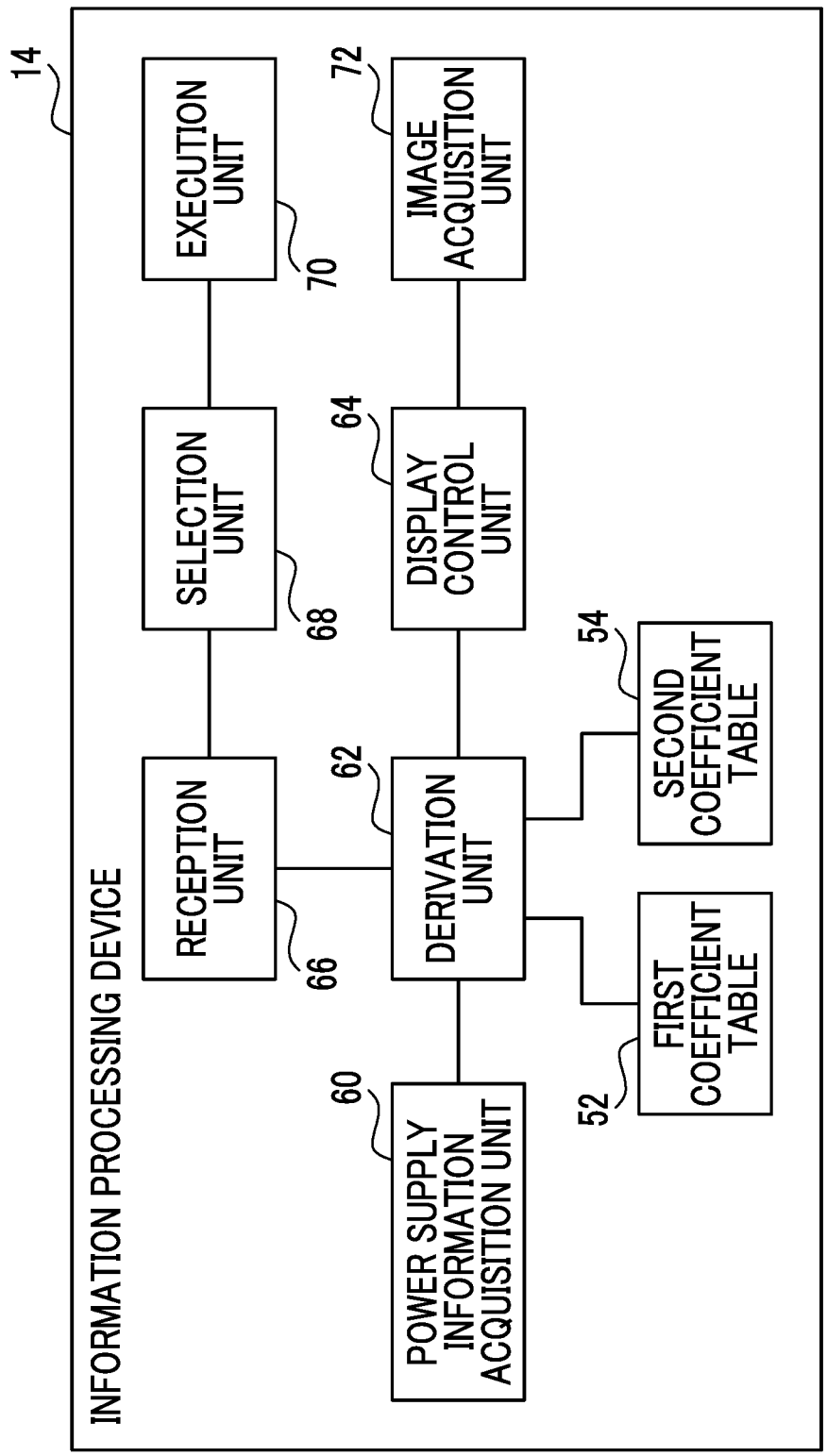
FIG. 6 is a block diagram showing an example of a functional configuration of an information processing device according to a first embodiment.

Next, a functional configuration of the information processing device 14 according to the present embodiment will be described with reference to FIG. 6. As shown in FIG. 6, the information processing device 14 includes a power supply information acquisition unit 60, a derivation unit 62, a display control unit 64, a reception unit 66, a selection unit 68, an execution unit 70, and an image acquisition unit 72. The CPU 40 of the information processing device 14 executes the information processing program 50 to function as the power supply information acquisition unit 60, the derivation unit 62, the display control unit 64, the reception unit 66, the selection unit 68, the execution unit 70, and the image acquisition unit 72.

The power supply information acquisition unit 60 acquires, from each imaging device 12, power supply information regarding a power supply state of the imaging device 12. The power supply information according to the present embodiment includes information representing whether the imaging device 12 is driven by being connected to an external power supply or is driven by the built-in battery 29. In a case where the imaging device 12 is driven by the built-in battery 29, the power supply information also includes information representing a remaining capacity of the built-in battery 29 (hereinafter, referred to as "remaining capacity information"). In the present embodiment, a case where a proportion (for example, 60%) of a remaining capacity of the built-in battery 29 to a capacity of the built-in battery 29 in a fully charged state is applied as the remaining capacity information will be described, but the present invention is not limited to this. For example, the remaining capacity of the built-in battery 29 itself may be applied as the remaining capacity.

The derivation unit 62 derives a processing capacity of the development processing of the RAW data in each imaging device 12 according to the power supply state represented by the power supply information acquired by the power supply information acquisition unit 60. Specifically, the derivation unit 62 refers to the first coefficient table 52 for the imaging device 12 driven by the built-in battery 29, and acquires a coefficient corresponding to a model of the imaging device 12 (hereinafter, referred to as a "first coefficient"). In this case, the derivation unit 62 refers to the second coefficient table 54 and acquires a coefficient corresponding to a format of image data received by the reception unit 66 which will be described later (hereinafter, referred to as a "second coefficient").

Therefore, the derivation unit 62 multiplies the remaining capacity information included in the power supply information acquired by the power supply information acquisition unit 60 by the acquired first coefficient and second coefficient to derive the processing capacity of the development processing of the RAW data. For example, in a case where the remaining capacity information of the imaging device 12 is 60%, the model is "DSC-A2", and the format of the image data is TIFF, the processing capacity of the imaging device 12 is 90 (=60×3.0×0.5). In the present embodiment, an upper limit value of the number of pieces of the RAW data that can be developed by the imaging device 12 is applied as the processing capacity.

On the other hand, the derivation unit 62 derives the processing capacity of the development processing of the RAW data as infinite for the imaging device 12 driven by the external power supply. For the imaging device 12 driven by the external power supply, the remaining capacity information may be treated as a predetermined value exceeding 100% representing a fully charged state, and the remaining capacity information may be multiplied by the first coefficient and the second coefficient to derive the processing capacity in the same manner as the imaging device 12 driven by the built-in battery 29.

The display control unit 64 performs a control of displaying information representing the processing capacity derived by the derivation unit 62 on the display unit 43. In addition, the display control unit 64 performs a control of displaying, on the display unit 43, information representing that the imaging device 12 in a predetermined state in which the power supply state is poor is unusable. The predetermined state in which the power supply state is poor includes, for example, a state in which the remaining capacity information included in the power supply information is equal to or less than a predetermined threshold value (for example, 20%). In addition, the display control unit 64 performs a control of displaying, on the display unit 43, an image represented by image data acquired by the image acquisition unit 72 which will be described later.

The reception unit 66 receives information representing the RAW data to be subjected to the development processing and a development parameter, which are input by a user via the input unit 44. In addition, the reception unit 66 receives information representing the imaging device 12 selected by a user via the input unit 44 according to the information representing the processing capacity displayed on the display unit 43.

The selection unit 68 selects the imaging device 12 represented by the information received by the reception unit 66. The execution unit 70 causes the imaging device 12 selected by the selection unit 68 to execute the development processing of the RAW data. Specifically, the execution unit 70 causes the imaging device 12 selected by the selection unit 68 to execute the development processing of the RAW data by transmitting, via the external I/F 45, the information representing the RAW data to be subjected to the development processing, the development parameter, and an execution instruction of the development processing.

In this case, in a case where the RAW data to be subjected to the development processing is stored in the imaging device 12 in a predetermined state in which the power supply state is poor, the execution unit 70 transfers the RAW data to the imaging device 12 selected by the selection unit 68, and then executes the development processing. In addition, the execution unit 70 transfers, even in a case where the RAW data to be subjected to the development processing is stored in the imaging device 12 other than the imaging device 12 selected by the selection unit 68, the RAW data to the imaging device 12 selected by the selection unit 68, and then executes the development processing. In addition, the execution unit 70 transfers, even in a case where the RAW data to be subjected to the development processing is stored in the information processing device 14, the RAW data to the imaging device 12 selected by the selection unit 68, and then executes the development processing.

The image acquisition unit 72 acquires the image data obtained by the image processing including the development processing by the imaging device 12 from the imaging device 12 as an execution source of the image processing via the external I/F 45.

Figure 7:
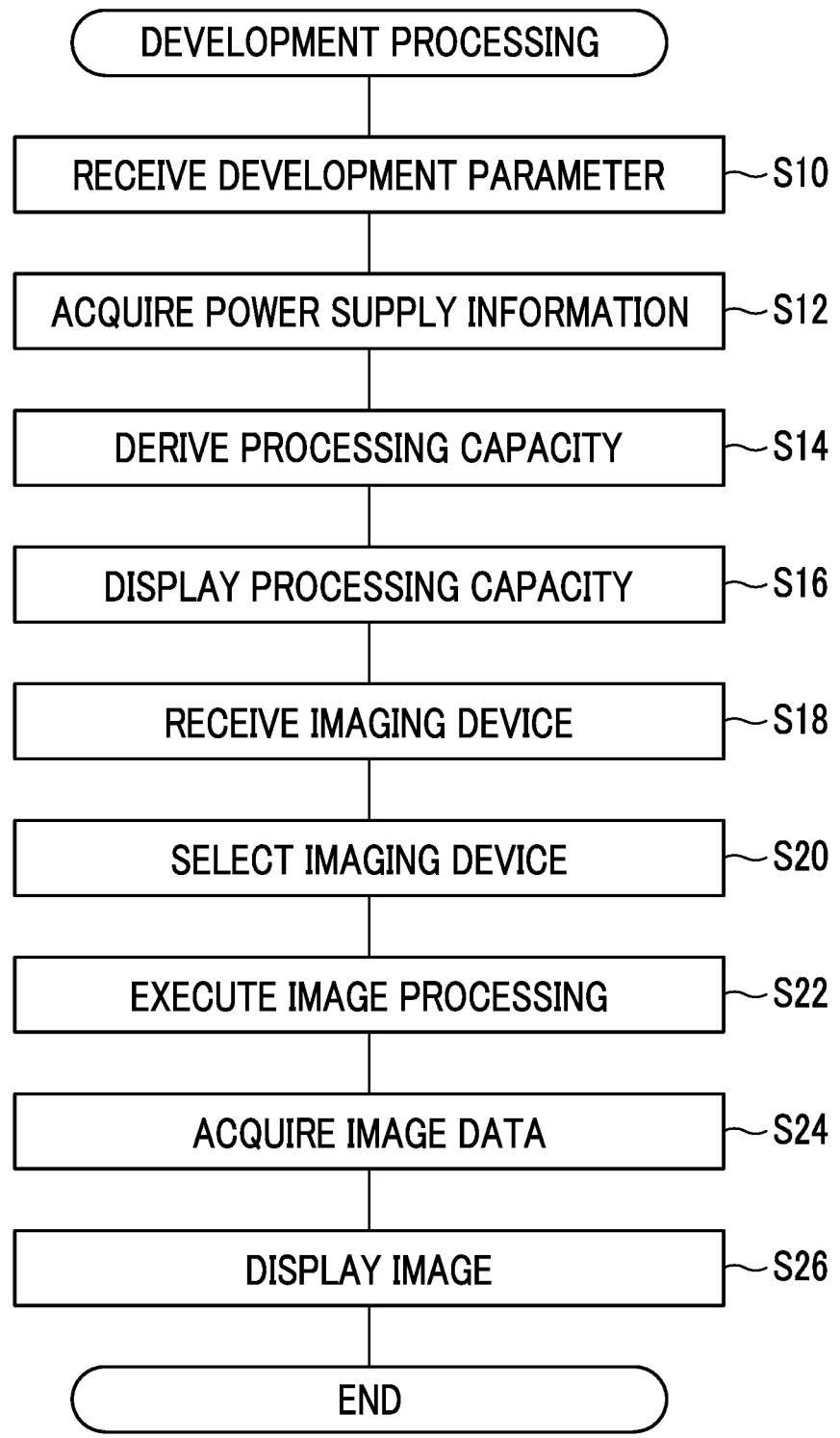
FIG. 7 is a flowchart showing an example of development processing according to the first embodiment.

Next, an operation of the image processing system 10 according to the present embodiment and an image processing method will be described with reference to FIG. 7. The development processing shown in FIG. 7 is executed by the CPU 40 of the information processing device 14 executing the information processing program 50. The development processing shown in FIG. 7 is executed, for example, in a case where the information representing the RAW data to be subjected to the development processing and the development parameter are input by a user via the input unit 44. In the present embodiment, the RAW data to be subjected to the development processing is stored in at least one of the storage unit 22 of each imaging device 12 or the storage unit 42 of the information processing device 14. The development parameter includes, for example, a parameter relating to an image quality such as a dynamic range, a white balance, and a sharpness, and a format of image data after development processing such as JPEG and TIFF.

In step S10 of FIG. 7, the reception unit 66 receives the information representing the RAW data to be subjected to the development processing and the development parameter, which are input by a user via the input unit 44. In step S12, the power supply information acquisition unit 60 acquires, from each imaging device 12, the power supply information regarding the power supply state of the imaging device 12.

In step S14, the derivation unit 62 derives the processing capacity of the development processing of the RAW data in each imaging device 12 according to the power supply state represented by the power supply information acquired by the processing in step S12, as described above.

In step S16, the display control unit 64 performs a control of displaying, on the display unit 43, the information representing the processing capacity derived by the processing in step S14, as described above. By the processing in step S16, a processing capacity display screen shown in FIG. 8 is displayed on the display unit 43 as an example. As shown in FIG. 8, on the processing capacity display screen according to the present embodiment, a predetermined message and an upper limit value of the number of pieces of the RAW data that can be developed by the imaging device 12 as the information representing the processing capacity of each imaging device 12 (described as "camera 1" to "camera 3" in the example of FIG. 8) are displayed.

Further, as shown in FIG. 8, on the processing capacity display screen according to the present embodiment, information representing that the imaging device 12 in a predetermined state in which the power supply state is poor ("camera 2" in the example of FIG. 8) is unusable is displayed. On the processing capacity display screen, an input box for a user to input the number of pieces of the RAW data to be developed is also displayed for the usable imaging device 12.

The user inputs, via the input unit 44, the number of pieces of the RAW data to be developed by the imaging device 12 corresponding to the input box in the input box of the processing capacity display screen, and then clicks an execution button. The user may input one or more numerical values in the input box of the number of pieces of the RAW data to be developed for only one imaging device 12, or may input one or more numerical values in the input box of the number of pieces of the RAW data to be developed for each of a plurality of the imaging devices 12. For example, a numerical value exceeding the processing capacity of the imaging device 12 corresponding to the input box of the number of pieces of the RAW data to be developed may be prevented from being input in the input box on the processing capacity display screen.

In step S18, the reception unit 66 receives the number of pieces of the RAW data to be developed input by the user on the processing capacity display screen, and receives the imaging device 12 having the received number of pieces of the RAW data to be developed of one or more as the imaging device 12 selected by the user. In step S20, the selection unit 68 selects the imaging device 12 represented by the information received by the processing in step S18.

In step S22, the execution unit 70 causes the imaging device 12 selected by the processing in step S20 to execute the development processing of the RAW data of the number received by the processing in step S18 using the development parameter received by the processing in step S10, as described above. In this case, for the RAW data stored in the selected imaging device 12, the execution unit 70 causes the imaging device 12 to execute the development processing.

For the RAW data that is not stored in the selected imaging device 12, the execution unit 70 transfers the RAW data to the selected imaging device 12, and then executes the development processing. In a case of this transfer, for example, the execution unit 70 may preferentially transfer the RAW data in descending order of size to the imaging device 12 having a high processing capacity derived by the processing in step S14.

The image processing unit 24 of the imaging device 12 to which the execution instruction is input by the processing in step S22 executes the image processing including the development processing of the RAW data.

In step S24, the image acquisition unit 72 acquires the image data obtained by the image processing including the development processing by the imaging device 12 from the imaging device 12 as the execution source of the image processing via the external I/F 45. In step S26, the display control unit 64 performs a control of displaying, on the display unit 43, the image represented by the image data acquired by the processing in step S24. In a case where the processing in step S26 ends, the development processing ends.

As described above, according to the present embodiment, the imaging device 12 that executes the development processing is selected according to the power supply state represented by the power supply information, and the selected imaging device 12 is caused to execute the development processing. Accordingly, it is possible to suppress failure in the development processing of the RAW data.

Second Embodiment

In the first embodiment, the embodiment in which the user selects the imaging device 12 that executes the development processing of the RAW data by inputting the number of pieces of the RAW data to be developed on the processing capacity display screen has been described. In the second embodiment, an embodiment in which the information processing device 14 selects the imaging device 12 that executes the development processing without inputting the information representing the imaging device 12 that executes the development processing to the user will be described. The configuration of the image processing system 10 (see FIG. 1), the hardware configuration of the imaging device 12 (see FIG. 2), and the hardware configuration of the information processing device 14 (FIG. 3) are the same as those in the first embodiment, and thus description thereof will be omitted.

Figure 9:
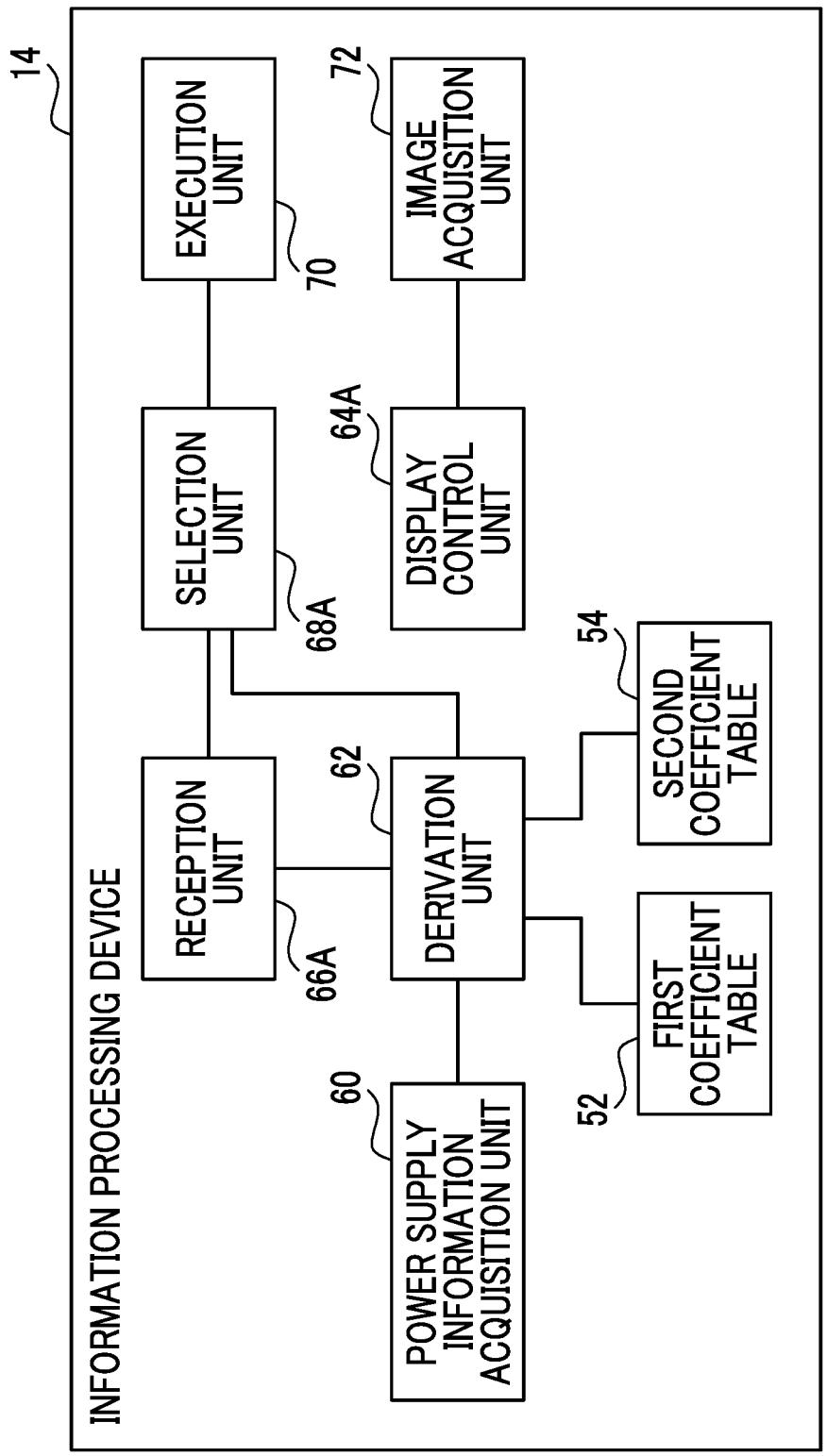
FIG. 9 is a block diagram showing an example of a functional configuration of an information processing device according to a second embodiment.

First, a functional configuration of the information processing device 14 according to the present embodiment will be described with reference to FIG. 9. Constituent elements having the same functions as those of the information processing device 14 according to the first embodiment are denoted by the same reference numerals as those in FIG. 6, and description thereof will be omitted. As shown in FIG. 9, the information processing device 14 includes the power supply information acquisition unit 60, the derivation unit 62, a display control unit 64A, a reception unit 66A, a selection unit 68A, the execution unit 70, and the image acquisition unit 72. The CPU 40 of the information processing device 14 executes the information processing program 50 to function as the power supply information acquisition unit 60, the derivation unit 62, the display control unit 64A, the reception unit 66A, the selection unit 68A, the execution unit 70, and the image acquisition unit 72.

The reception unit 66A receives information representing the RAW data to be subjected to the development processing and a development parameter, which are input by a user via the input unit 44.

The selection unit 68A selects the imaging device 12 having the highest processing capacity derived by the derivation unit 62. The selection unit 68A may select a plurality of the imaging devices 12 in order from the imaging device 12 having the highest processing capacity derived by the derivation unit 62.

In a case where there are a plurality of pieces of the RAW data to be subjected to the development processing received by the reception unit 66A and the number of pieces of the RAW data exceeds the processing capacity derived by the derivation unit 62 for each imaging device 12, the selection unit 68A selects a plurality of the imaging devices 12 in which a total of the derived processing capacities is equal to or greater than the number of the pieces of the RAW data to be subjected to the development processing. The number of pieces of the RAW data to be subjected to the development processing is an example of the processing capacity required for the development processing of the RAW data.

The display control unit 64A performs a control of displaying, on the display unit 43, an image represented by image data acquired by the image acquisition unit 72.

Next, an operation of the image processing system 10 according to the present embodiment will be described with reference to FIG. 10. Steps in FIG. 10 that execute the same processing as in FIG. 7 are denoted by the same reference numerals and description thereof will be omitted.

Figure 10:
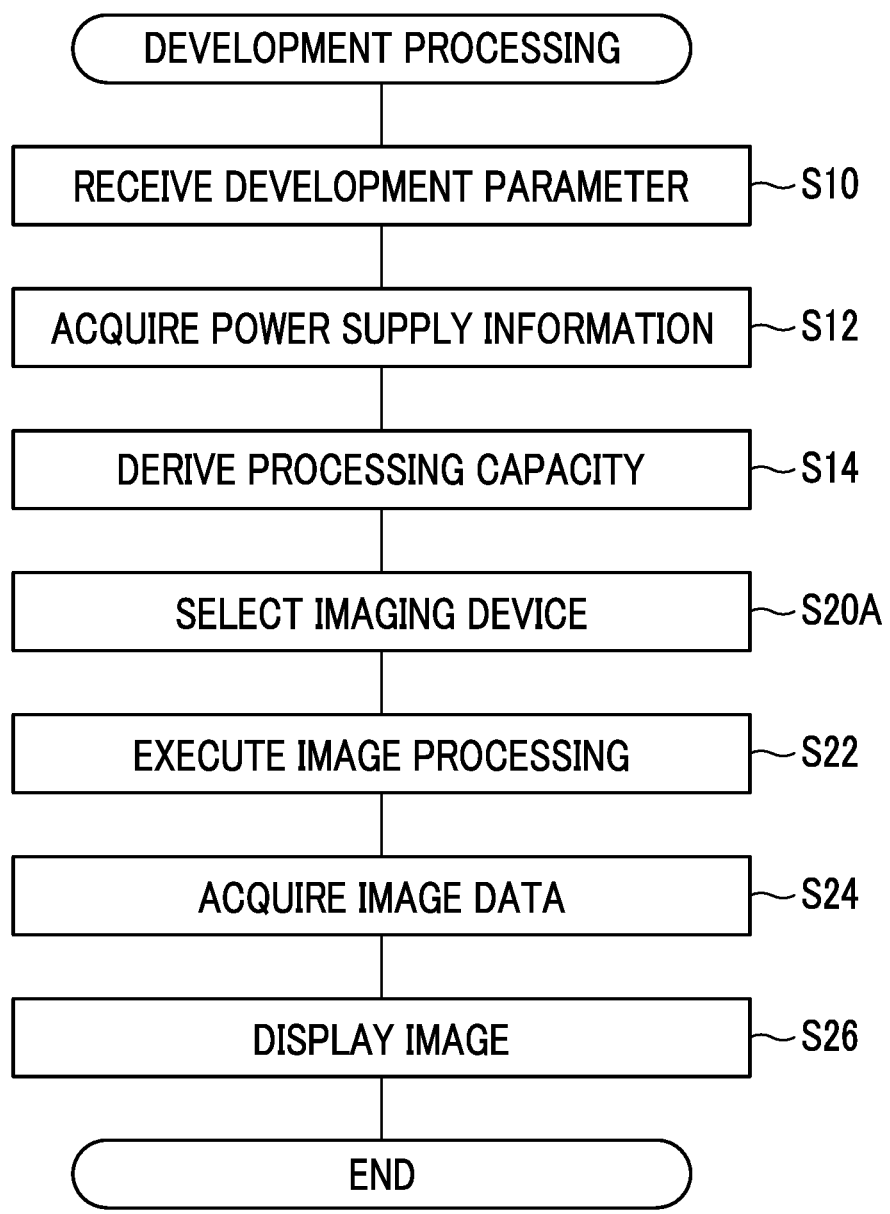
FIG. 10 is a flowchart showing an example of development processing according to the second embodiment.

In a case where the processing in step S14 of FIG. 10 ends, the processing proceeds to step S20A. In step S20A, the selection unit 68A selects the imaging device 12 according to the processing capacity derived by the processing in step S14, as described above.

As described above, according to the present embodiment, the same effect as that of the first embodiment can be obtained.

In each of the above-described embodiments, the case where the imaging device is applied as the image processing device that executes the image processing including the development processing of the RAW data has been described, but the present invention is not limited to this. As the image processing device that executes the image processing including the development processing of the RAW data, a device other than the imaging device that is driven by the built-in battery and has the image processing unit 24 may be applied.

In each of the above-described embodiments, the case where the upper limit value of the number of pieces of the RAW data that can be developed by the imaging device 12 is applied as the processing capacity of the development processing of the RAW data in the imaging device 12 has been described, but the present invention is not limited to this. For example, as the processing capacity of the development processing of the RAW data in the imaging device 12, an upper limit value of a period during which the imaging device 12 can execute the development processing of the RAW data may be applied.

Various processors other than the CPU may execute various types of processing executed by the CPU executing software (programs) in each of the above-described embodiments. Examples of the processor in this case include a programmable logic device (PLD) capable of changing a circuit configuration after manufacture, such as a field programmable gate array (FPGA), an exclusive electric circuit that is a processor having a circuit configuration exclusively designed to execute a specific process, such as an application specific integrated circuit (ASIC), and the like. The above-described various types of processing may be executed by one of these various processors, or a combination of two or more processors of the same type or different types (for example, a combination of a plurality of FPGAs and a combination of a CPU and an FPGA). The hardware structure of these various processors is, more specifically, an electric circuit in which circuit elements such as semiconductor elements are combined.

In each of the above-described embodiments, the aspect in which the information processing program 50 is stored (installed) in the storage unit 42 in advance has been described, but the present invention is not limited to this. The information processing program 50 may be provided in a form recorded in a recording medium such as a compact disk read only memory (CD-ROM), a digital versatile disk read only memory (DVD-ROM), and a universal serial bus (USB) memory. In addition, the information processing program 50 may be downloaded from an external device via a network.

The disclosure of JP2018-062727 filed on Mar. 28, 2018 is incorporated herein by reference in its entirety. All documents, patent applications, and technical standards described in this specification are herein incorporated by reference to the same extent that each individual document, patent application, or technical standard was specifically and individually indicated to be incorporated by reference.

What is claimed is:

1. An information processing device that controls a plurality of image processing devices, each of which includes an image processing unit that executes image processing including development processing of RAW data obtained by imaging, the information processing device comprising:
   a processor configured to execute a process that includes:
     acquiring power supply information regarding power supply states of the plurality of image processing devices,
     deriving a processing capacity of the development processing in each of the plurality of image processing devices according to the power supply state indicated by the acquired power supply information,
     selecting an image processing device that executes the development processing according to the derived processing capacity, and
     instructing the selected image processing device to execute the development processing.

2. The information processing device according to claim 1, wherein:
   the RAW data is obtained as a result of imaging performed by a imaging unit that is included in each of the plurality of image processing devices.

3. The information processing device according to claim 2, wherein:
   the power supply information includes information indicating whether the image processing device is driven by being connected to an external power supply or is driven by a built-in battery of the image processing device, and information indicating a remaining capacity of the built-in battery in a case in which the image processing device is driven by the built-in battery.

4. The information processing device according to claim 1,
   wherein the process includes:
     outputting information indicating the derived processing capacity of each of the plurality of image processing devices to be displayed on a display,
     receiving information indicating an image processing device selected by a user according to the information displayed on the display, and
     selecting the image processing device represented by the received information.

5. The information processing device according to claim 4,
   wherein the processor causes display, on the display, of information representing that an image processing device in a predetermined state in which the power supply state is poor is unusable.

6. The information processing device according to claim 1, wherein:
   a plurality of pieces of the RAW data are present, and
   in a case in which a processing capacity required for the development processing of the plurality of pieces of the RAW data exceeds the derived processing capacity for each of the plurality of image processing devices, the processor selects a plurality of the image processing devices in which a total of the derived processing capacities is equal to or greater than the processing capacity required for the development processing.

7. The information processing device according to claim 1,
   wherein the processor derives the processing capacity according to a format of image data after the development processing.

8. The information processing device according to claim 1,
   wherein, in a case in which the RAW data to be subjected to the development processing is stored in an image processing device in a predetermined state in which the power supply state is poor, the processor transfers the stored RAW data to the selected image processing device, and then causes the selected image processing device to execute the development processing.

9. An information processing method that controls a plurality of image processing devices, each of which includes an image processing unit that executes image processing including development processing of RAW data obtained by imaging and an information processing device, the information processing method comprising:
   acquiring power supply information regarding power supply states of the plurality of image processing devices;
   deriving a processing capacity of the development processing in each of the plurality of image processing devices according to the power supply state indicated by the acquired power supply information;
   selecting an image processing device that executes the development processing according to the derived processing capacity; and
   instructing the selected image processing device to execute the development processing.

10. An image processing system comprising:
   a plurality of image processing devices, each of which includes an image processing unit that executes image processing including development processing of RAW data obtained by imaging; and
   a processor configured to execute a process that includes:
     acquiring power supply information regarding power supply states of the plurality of image processing devices,
     deriving a processing capacity of the development processing in each of the plurality of image processing devices according to the power supply state indicated by the acquired power supply information, selecting an image processing device that executes the development processing according to the derived processing capacity, and instructing the selected image processing device to execute the development processing.

* * * * *